Sept. 19, 1961 D. H. WINTER 3,000,343
AIRCRAFT CARRIER
Filed July 6, 1959 2 Sheets-Sheet 1

INVENTOR
D. H. WINTER
BY
ATTORNEYS

Sept. 19, 1961 D. H. WINTER 3,000,343
AIRCRAFT CARRIER
Filed July 6, 1959 2 Sheets-Sheet 2

INVENTOR
D. H. WINTER
BY
ATTORNEYS

3,000,343
AIRCRAFT CARRIER

David H. Winter, Silver Spring, Md., assignor to the United States of America, as represented by the Secretary of the Navy
Filed July 6, 1959, Ser. No. 825,376
8 Claims. (Cl. 114—43.5)
(Granted under Title 35, U.S. Code (1952), sec. 266)

The invention described herein may be manufactured and used by or for the Government of the United States of America for governmental purposes without the payment of any royalties thereon or therefor.

This invention relates to an aircraft carrier and more particularly to an aircraft carrier having both an upper and a lower flight deck.

In accordance with the prior art, aircraft carriers have generally been provided with but a single flight deck, which flight deck is adapted to be used alternatively for take-off and landing operations. The prior art decks have generally not been particularly adapted for simultaneous take-off and landing operations. Accordingly, the prior art aircraft carriers are limited in their scope of operations, being incapable of launching intercept or attack planes while landing operations are taking place and vice versa. There has therefore been a long felt need for an aircraft carrier so constructed as to be capable of simultaneously landing planes and launching other planes so that for example, planes may be landed while attack bombers and/or intercept fighters are being launched. The advent of the jet propelled plane has further complicated the problem in that it essentially makes it impossible to launch planes from an enclosed area below the conventional flight deck, since the noise level created by the jet plane is at such a high level and pitch as to cause injury to personnel in the vicinity of the plane.

In accordance with the instant invention, an aircraft carrier is so constructed as to have an upper flight deck and a pair of lower flight decks, all of said flight decks being out in the open so as to eliminate or substantially reduce the noise hazard created by modern day jet planes. The auxiliary lower flight decks are, in accordance with the instant invention, located at the forward end of the carrier at each side thereof and are provided with any of the well known steam or hydraulic launching catapults.

It is accordingly an object of this invention to provide an aircraft carrier that overcomes the operational disadvantages of the prior art carriers.

Another object of this invention is to provide an aircraft carrier capable of simultaneously carrying out plane landing and launching operations.

A further object of this invention is to provide an aircraft carrier capable of simultaneously carrying out plane landing and launching operations, with all such operations being carried out in the open so as to eliminate the noise hazard created by modern day jet planes.

Still another object of this invention is to provide an aircraft carrier having more than one flight deck, by means of slight modification of the conventional flight deck found on an aircraft carrier, and by slight modification of the conventional storage or hangar deck found on such a carrier.

Other objects and many of the attendant advantages of this invention will be readily appreciated as the same becomes better understood by reference to the following detailed description when considered in connection with the accompanying drawings, wherein.

Figure 1:
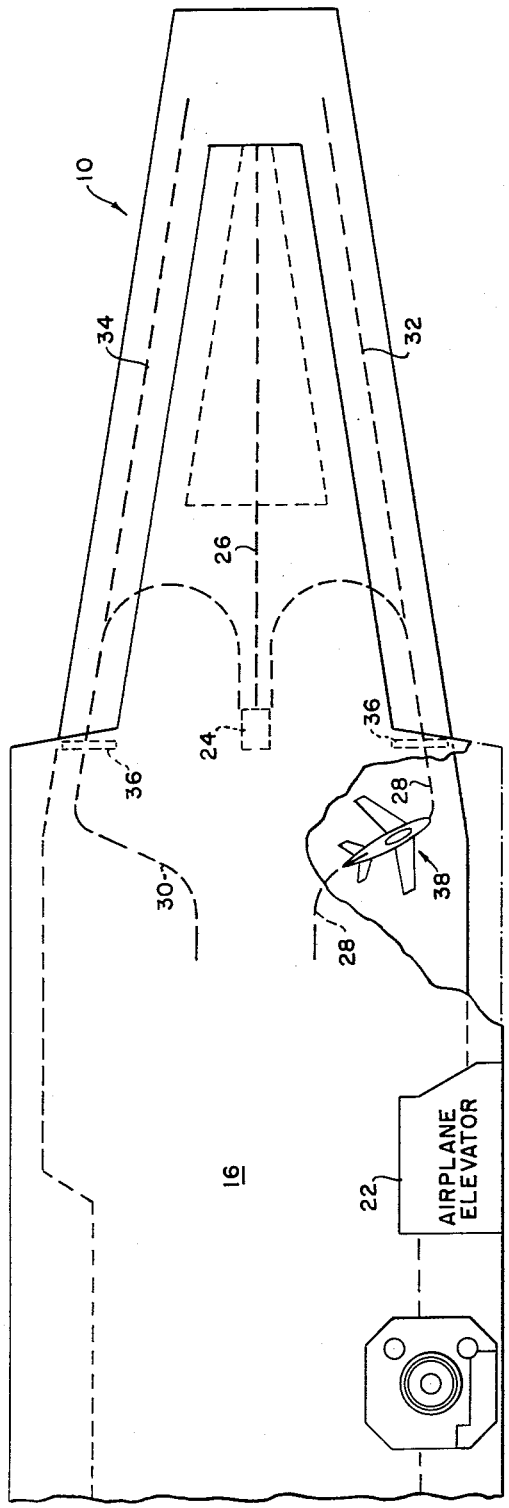
FIG. 1 is a plan view, partially broken away, of an aircraft carrier constructed in accordance with this invention, showing the upper and lower flight decks thereof.

Referring now to the drawings wherein like reference characters designate like or corresponding parts throughout the several views, there is shown in FIG. 1 an aircraft carrier 10 constructed in accordance with the instant invention.

The carrier 10 comprises a hull 12 having a lower or hangar deck 14 where planes are adapted to be stored and/or serviced, and an upper flight deck 16 from which planes may be launched and upon which planes may land.

In accordance with the instant invention the carrier 10 is modified to the extent of providing it with a pair of lower flight decks 18 and 20.

It is emphasized that the aircraft carrier 10 is also provided with a plurality of conventional airplane elevators 22 and 24. In addition the upper flight deck, may if desired, be provided with a catapult 26 of the steam or hydraulic type, which are conventional and well known in the art.

For purposes of launching planes from the lower decks 18 and 20, each of said decks is provided with a conveyer system including conveyer devices 28 and 30 for purposes of conveying planes from the hangar area 14 to the respective lower flight decks. Since the lower flight decks 18 and 20 are comparatively short, each of said decks is provided with a catapult 32 and 34 which may be either of the same construction as the catapult 26, or may take any desired form known in the art.

Figure 2:
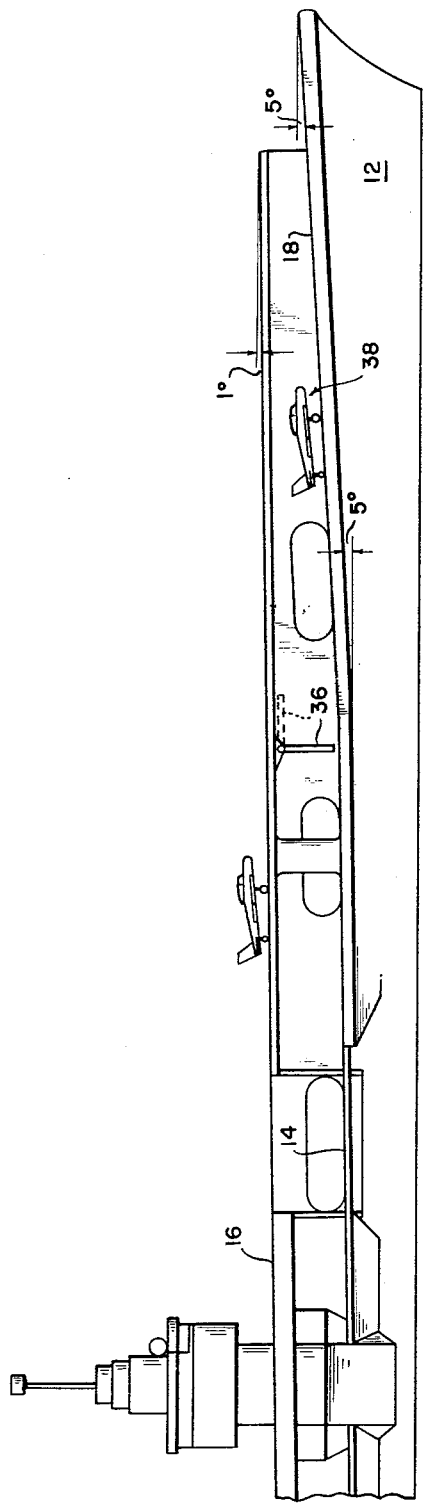
FIG. 2 is an elevational view of the structure shown in FIG. 1 as viewed from the starboard side of the carrier.
Figure 3:
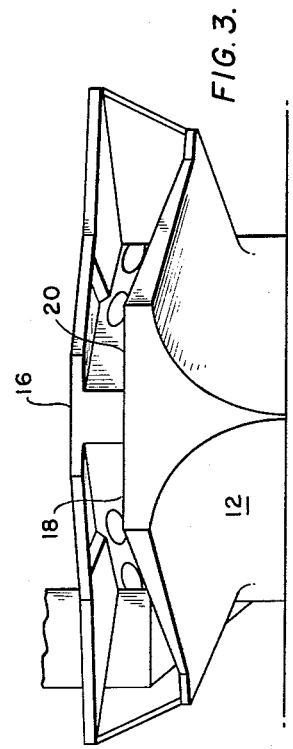
FIG. 3 is a head on view of the instant aircraft carrier, as seen looking directly at the bow thereof.

It is pointed out that the upper flight deck 16 is of such a width that it overhangs each of the lower flight decks 18 and 20 to at least a slight degree, as can readily be seen in FIG. 3. In addition, the underside of the upper flight deck is provided with a jet blast deflector 36 adjacent the rearmost end of each of the flight decks 18 and 20. Each of the jet deflectors 36 is pivotally connected to the upper deck 16 at its upper end and is adapted to be raised to the dotted line position shown in FIG. 2 as planes are conveyed by the conveyers 28 and 30 onto the respective decks 18 and 20 and into engagement with the catapults 32 and 34 respectively. Once a plane 38 is in position for launching on a lower flight deck the blast deflector 36 is lowered and the plane may then be launched.

At this point it is emphasized that the instant invention provides a dual level aircraft carrier, without materially increasing the keel to top deck height, over that of a conventional single deck aircraft carrier, by inclining the upper deck relative to the horizontal by one degree from the stern of the ship to the bow thereof (see FIG. 2). Since the conventional aircraft carrier is in the neighborhood of 1000 ft. in length it can be seen that this one degree of inclination will provide a substantial amount of clearance below the top deck at the bow end of the ship, thereby providing space for the lower flight decks 18 and 20.

The lower flight decks are not on the same level as the hangar deck 14, which is horizontal, but rather are inclined thereto at an angle of five degrees to the horizontal. The inclination of the lower flight decks 18 and 20 commences in the area adjacent the blast deflectors 36. The angle of five degrees is resorted to in order to provide the lower flight decks 18 and 20 with a proper launching angle.

It is reemphasized that in accordance with the preferred embodiment of the invention, a twin deck aircraft carrier is provided having two levels for flight operations. In accordance with the preferred embodiment of the invention, the intercept catapult area is on the lower flight decks 18 and 20.

The instant aircraft configuration provides a good ship design and allows use of jet-type aircraft to be catapulted from either level. In addition, the instant invention provides two levels for launching, thereby providing greater launching capabilities, including the simultaneous launching and landing operations that can be handled on the respective levels. Another point that should not be overlooked is that the location of the lower launching decks 18 and 20 relative to the hangar deck 14 provides an area of protection for launching preparations for said lower levels, which is of course impossible where launching operations are carried out in the open on the upper level, as is conventionally the case. It is also pointed out that by sloping the respective decks of the instant carrier, the lower level catapult deck is placed at an optimum angle to provide the best launching angle, and by angulating the upper deck sufficient free board is provided for the lower level launching area.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An aircraft carrier comprising, a hull, an upper flight deck, a pair of lower flight decks located beneath and at least partially overlapped by said upper flight deck adjacent the respective sides of the hull, and extending from a point forward of midships of the hull to the bow end of said hull.

2. An aircraft carrier comprising, a hull, an upper flight deck inclined at an angle of one degree to the horizontal, a pair of lower flight decks located beneath and at least partially overlapped by said upper flight deck adjacent the respective sides of the hull and extending from a point forward of midships of the hull of the bow end of said hull.

3. An aircraft carrier comprising, a hull, an upper flight deck inclined at an angle of one degree to the horizontal, a pair of lower flight decks located beneath and at least partially overlapped by said upper flight deck adjacent the respective sides of the hull and extending from a point forward of midships of the hull to the bow end of said hull; and each of said lower flight decks being inclined at an angle of five degrees to the horizontal throughout its length.

4. An aircraft carrier comprising, a hull, an upper flight deck, a pair of lower flight decks located beneath and at least partially overlapped by said upper flight deck adjacent the respective sides of the hull, and extending from a point forward of midships of the hull to the bow end of said hull, each of said lower flight decks being inclined at an angle of five degrees to the horizontal throughout its length.

5. An aircraft carrier comprising, a hull, an upper flight deck extending the length of said hull, a pair of lower flight decks beneath and at least partially overlapped by said upper flight deck adjacent the sides of said hull and extending from a point forward of the midships of the hull to the bow end of said hull; said upper flight deck being inclined at an angle of one degree to the horizontal throughout its entire length, and each of said lower flight decks being inclined at an angle of five degrees to the horizontal throughout its length.

6. An aircraft carrier comprising a hull, said hull having an upper flight deck, a pair of lower flight decks located under said upper flight deck and at least partially overlapped by said upper flight deck, each of said lower flight decks extending along a side of the hull from the point forward of midship to the bow end of the hull; and each of said lower flight decks being provided with an airplane catapult.

7. An aircraft carrier as set forth in claim 6 wherein, each of said lower flight decks is inclined at an angle of 5° to the horizontal throughout its length.

8. An aircraft carrier as set forth in claim 6 wherein, said upper flight deck is inclined at an angle of 1° to the horizontal throughout its entire length, and each of said lower flight decks is inclined at an angle of 5° to the horizontal throughout its length.

References Cited in the file of this patent

UNITED STATES PATENTS

| | | |
|---|---|---|
| Re. 16,164 | Hall | Sept. 15, 1925 |
| 1,913,207 | McDougall | June 6, 1933 |
| 2,092,250 | Hagan | Sept. 7, 1937 |
| 2,349,930 | Atkinson | May 30, 1944 |
| 2,381,583 | Fechtenburg | Aug. 7, 1945 |
| 2,711,707 | Seitzman | June 28, 1955 |